(12) United States Patent
Cooper

(10) Patent No.: US 7,823,327 B2
(45) Date of Patent: Nov. 2, 2010

(54) METHOD AND APPARATUS FOR ACCELERATING PLANT GERMINATION AND GROWTH

(76) Inventor: Evan N. Cooper, 5012 Sharynne La., Torrance, CA (US) 90505

( * ) Notice: Subject to any disclaimer, the term of this patent is extended or adjusted under 35 U.S.C. 154(b) by 209 days.

(21) Appl. No.: 12/058,386

(22) Filed: Mar. 28, 2008

(65) Prior Publication Data

US 2008/0236034 A1 Oct. 2, 2008

Related U.S. Application Data

(60) Provisional application No. 60/920,417, filed on Mar. 28, 2007.

(51) Int. Cl.
*A01G 31/02* (2006.01)
(52) U.S. Cl. .......................................................... 47/61
(58) Field of Classification Search ...................... 47/60, 47/61, 14–16
See application file for complete search history.

(56) References Cited

U.S. PATENT DOCUMENTS 1,637,250 A * 7/1927 Ashing .......................... 47/14
4,385,468 A * 5/1983 Yoshiaki ........................ 47/14

* cited by examiner

*Primary Examiner*—Rob Swiatek
*Assistant Examiner*—Kirsten C Hayes
(74) *Attorney, Agent, or Firm*—Gates & Cooper LLP

(57) ABSTRACT

A method and apparatus for germinating seeds is disclosed. In one embodiment, the apparatus comprises a plurality of translucent hollow spheres, each sphere having apertures there through for entry and egress of liquid and air, wherein each of the plurality of translucent hollow spheres includes soil and at least one of the seeds; a tray, for confining the spheres to an basin area within a periphery of the tray while permitting the spheres to roll on a rolling surface within the periphery of the tray; a platform; and a plurality of solenoids disposed on the platform for tilting the tray to displace the spheres, each solenoid having a shaft longitudinally extendable in a direction away from the platform upon activation of the solenoid and each shaft having an end distal from the solenoid coupled proximate to the periphery of the tray.

12 Claims, 7 Drawing Sheets

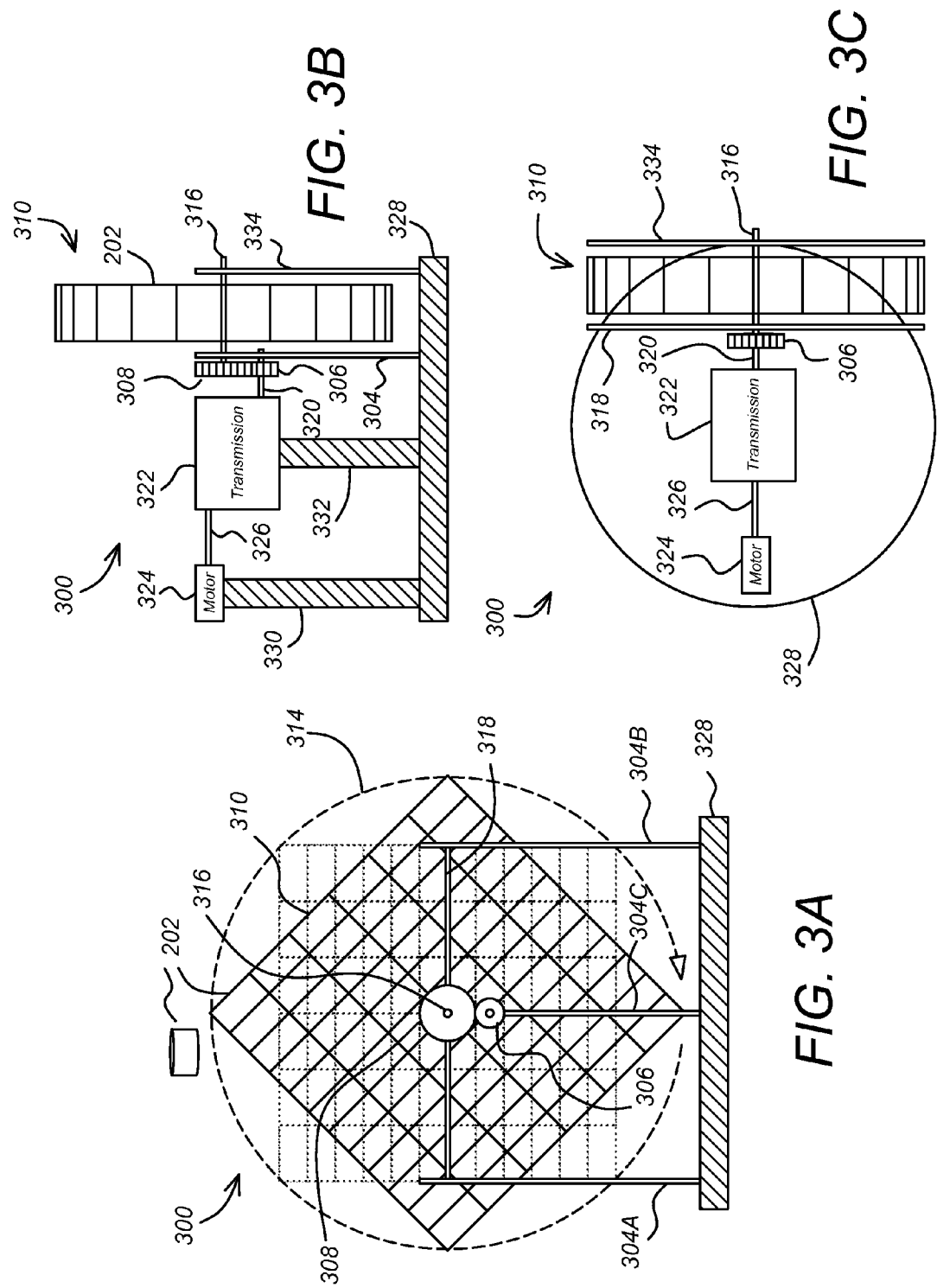

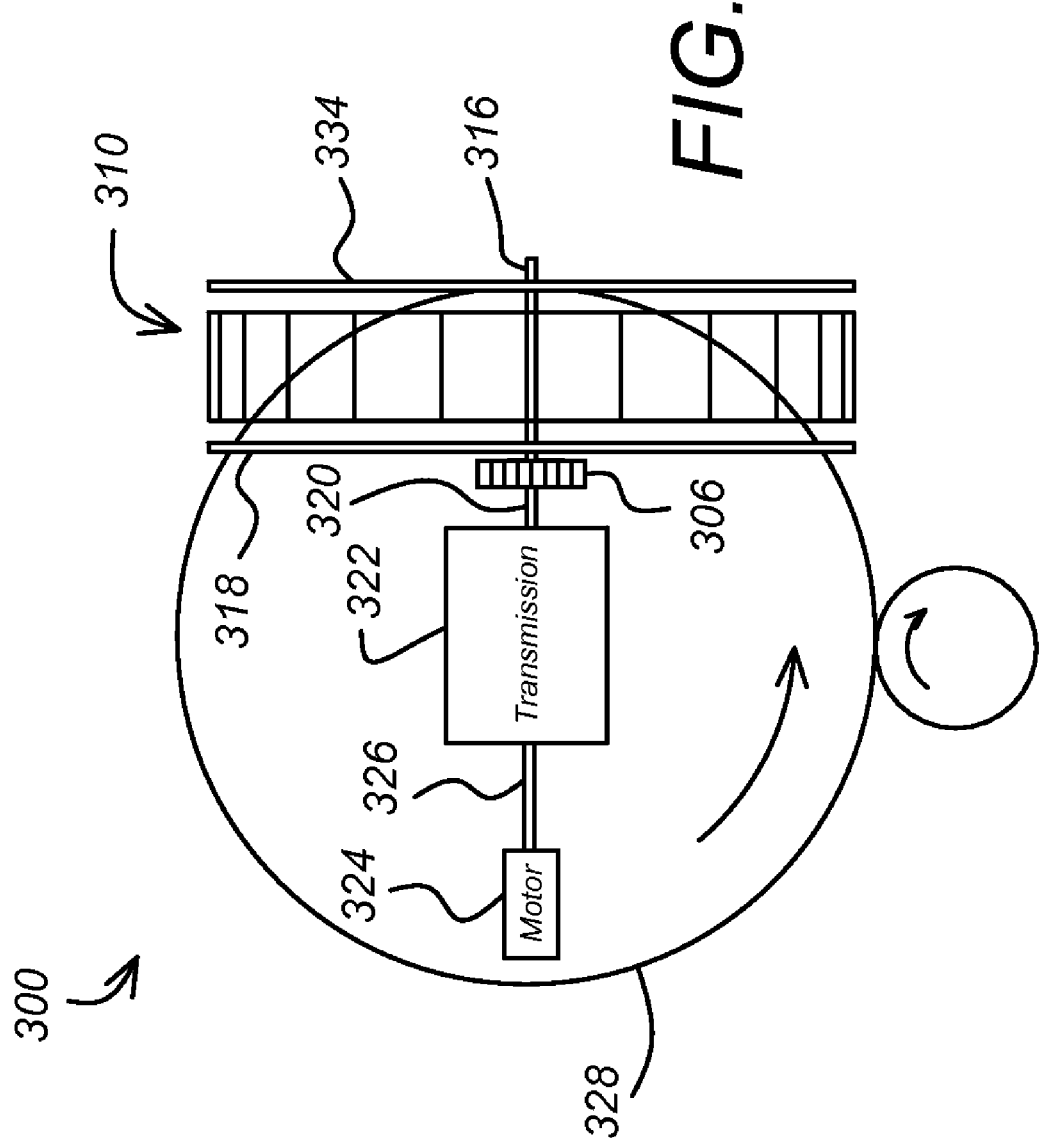

METHOD AND APPARATUS FOR ACCELERATING PLANT GERMINATION AND GROWTH

CROSS REFERENCE TO RELATED APPLICATIONS

This application claims benefit of U.S. Provisional Patent Application No. 60/920,417, entitled "METHOD AND APPARATUS FOR ACCELERATING PLANT GERMINATION AND GROWTH," by Evan N. Cooper, filed Mar. 28, 2007, which application is hereby incorporated by reference herein.

BACKGROUND OF THE INVENTION

1. Field of the Invention

This invention relates generally to agricultural systems and methods and in particular to a method and apparatus for promoting rapid seed germination.

2. Description of the Related Art

Agriculture is a keystone to civilization, and for centuries, mankind has devised ways to accelerate and maximize plant growth. In the past, this was accomplished by providing the germinating seed with an optimal environment (temperature, sun, soil composition) and enriching the soil with natural and chemical fertilizers.

Although these methods of maximizing plant growth are effective in promoting the rapid growth of plants, there is still a need to promote and even further accelerate germination and growth. The present invention satisfies this need.

SUMMARY OF THE INVENTION

To address the requirements described above, the present invention discloses a method and apparatus for germinating seeds. In one embodiment, the apparatus comprises a plurality of translucent hollow spheres, each sphere having apertures there through for entry and egress of liquid and air, wherein each of the plurality of translucent hollow spheres includes soil and at least one of the seeds; a tray, for confining the spheres to an basin area within a periphery of the tray while permitting the spheres to roll on a rolling surface within the periphery of the tray; a platform; and a plurality of solenoids disposed on the platform for tilting the tray to displace the spheres, each solenoid having a shaft longitudinally extendable in a direction away from the platform upon activation of the solenoid and each shaft having an end distal from the solenoid coupled proximate to the periphery of the tray. In another embodiment, the method comprises the steps of placing a seed in a translucent container having soil; orienting the container to a first orientation; and repeatedly and/or continuously reorienting the container to a series of other orientations.

BRIEF DESCRIPTION OF THE DRAWINGS

Referring now to the drawings in which like reference numbers represent corresponding parts throughout:

FIGS. 3A-3D are diagrams illustrating an apparatus that may be used to perform the method steps illustrated in FIG. 1;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
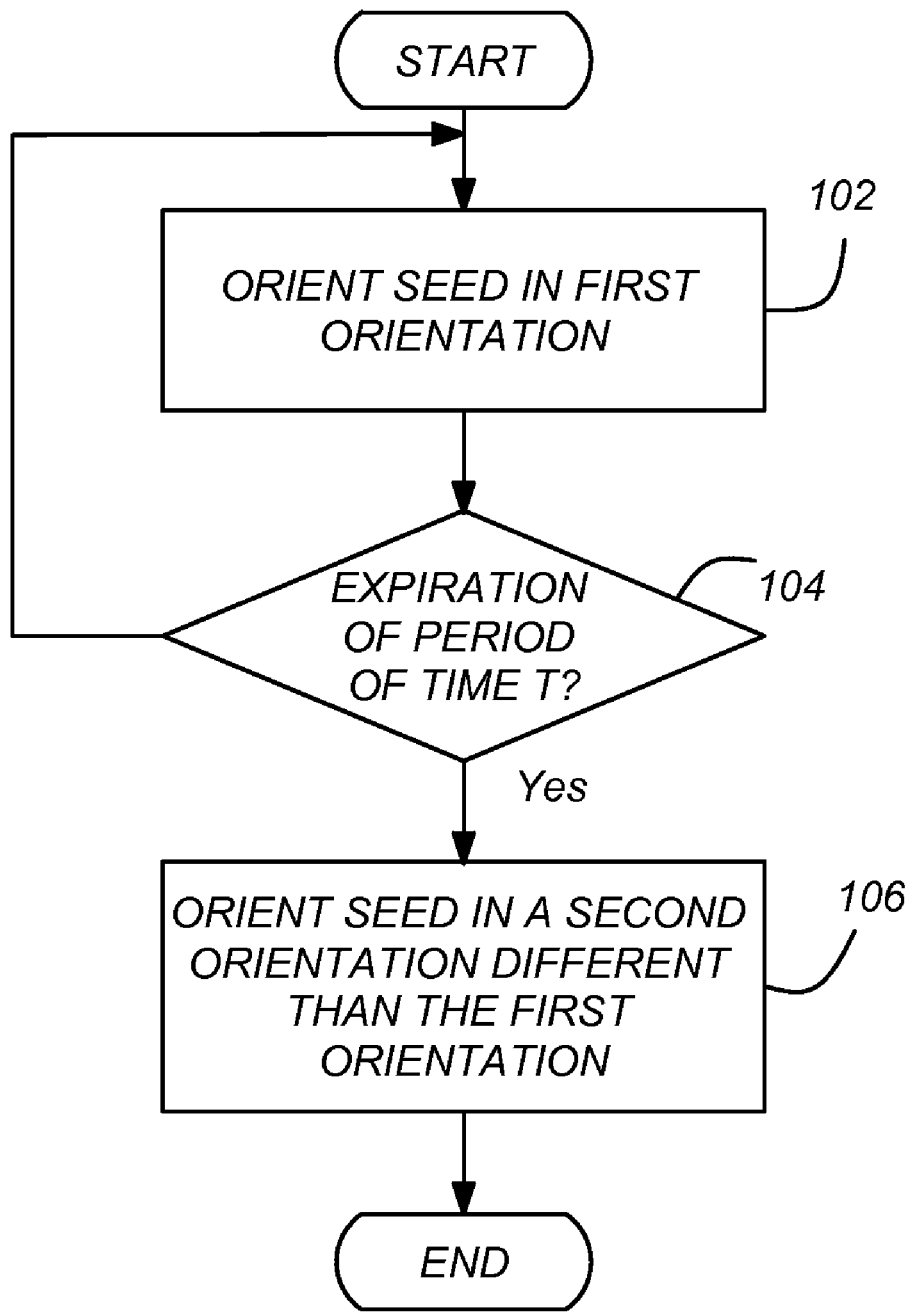
FIG. 1 is a block diagram showing exemplary method steps for practicing one embodiment of the present invention.

FIG. 1 is a flow chart illustrating exemplary steps that can be used to practice the present invention. FIG. 1 is discussed below in concert with FIG. 2, which illustrates one technique for performing the steps shown in FIG. 1.

Figure 2:
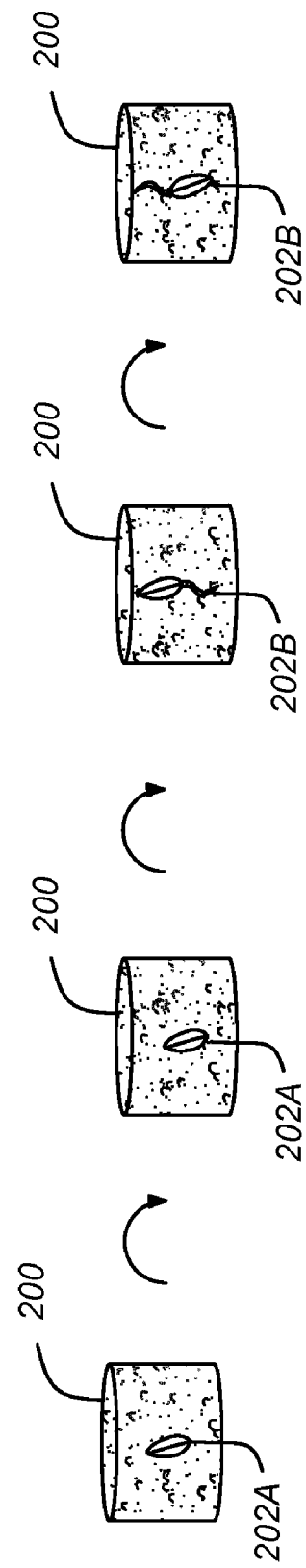
FIG. 2 is a diagram illustrating the performance of the method steps shown in FIG. 1.

The process begins by placing the seed in a first orientation, as shown in block 102. In one embodiment, this is accomplished by placing the seed, within a canister 200 having soil with suitable nutrients and water. The canister 200 is also transparent to light, so as to permit the exposure of the seeds to necessary energy for growth. The canister 200 is then oriented to a first position as shown in FIG. 2. After the expiration of a suitable period of time period T, as shown in block 104, the seed is placed in a second orientation different from the first orientation, as shown in block 106. This can be accomplished, for example, by orienting the canister 200 (which includes the seed) as shown in FIG. 2. In the embodiment shown in FIG. 2, the canister 200 (along with the seed) is reoriented 180 degrees from the first orientation. It is important that the second orientation differ from the first orientation in such a way as to expose the seed to gravity along a vector that is different from the first orientation. In other words, the plane of rotation should be such that the seed is not simply about the gravitational vector, but rotated about an axis perpendicular or at least not parallel to the gravitational vector.

This process continues, with by rotating the canister 200 after each expiration of a suitable time period T until the seeds 202A have germinated 202B to the desired amount.

The period and amount of rotation for each rotation can be varied to achieve optimal results. Experimental results were obtained for rotating the canister 90 degrees every 12 hours and rotating the canister 180 degrees every 12 hours. Rotation of the canisters (and hence, the seeds) 180 degrees every 12 hours accelerated germination by approximately 32% while, rotation by 90 degrees with a time period of 12 hours accelerated germination by approximately 11%.

In one embodiment, the rotation amount, and period between rotations is randomly selected to approximate the effect of a random gravity vector on the germination of the seed. The statistics of such random selection can be varied according to the species of plant being germinated, as can the parameters of the non-random embodiment above.

In yet another embodiment of the invention, the gravity vector applied to the germinating seeds may be continuously varied.

FIGS. 3A-3C are diagrams illustrating one embodiment of an apparatus for subjecting germinating seeds to either a periodically or continually varying gravity vector. In this embodiment, the seeds are placed in adjacent and optionally interlocking canisters (which may be of cylindrical or rectangular shape) to create a matrix 310 of canisters. An axle 316 is placed through the center of the matrix 310. The axle 316 is rotatingly affixed to the matrix 310 so that rotating the axle 316 also rotates the matrix 310 about the same axis. The axle 316 is also fixed to a gear 308 such that rotations of the gear 306 result in rotations of the matrix 310.

The gear 308 is driven by a drive gear 306. The drive gear 306 is driven by an attached drive shaft 320. The drive shaft is driven by a transmission 322 which implements a gear reduction so that rotations in a motor 324 drive shaft 326 are reduced by an appropriate factor so that the matrix 310 is rotated quickly enough to vary the gravitational vector relative to the seeds in the canisters 310, but not so quickly that centripetal force creates a pseudogravitational force. In one embodiment, the motor speed, gear reduction, and size of the gear 308 and drive gear 306 is chosen so that the seeds are rotated approximately every 4 seconds.

The axle 316 is held in place by support members 304A, 304B and 304C, which are affixed to the base 328, and by cross members 318 and 334 which are affixed to support members 304A-304C. In one embodiment, the drive gear 306 is held in place by inserting the drive shaft 320 in a suitable aperture in cross member 306.

The motor 324 and transmission 332 are held in place by support members 330 and 332, which are also affixed to the base.

The foregoing design can be used to continuously rotate the canisters 202 (and seeds) or can be used to rotate the canisters at periodic intervals. For periodic rotation, for example, the motor 324 can be a stepper motor, or may be a brushed motor that is activated for a sufficient period of time to rotate the canisters 202 the desired angular amount and at the appropriate intervals. For example, to rotate the canisters 200 and seeds 180 degrees every 12 hours, the motor could be activated every 12 hours for approximately one second.

FIG. 3D presents an embodiment of the apparatus shown in FIG. 3A-3C, but in which the base 328 is rotatable via a idler pulley 340 coupled to a motor. This permits further re-orientation of the seeds during germination.

Figure 4:
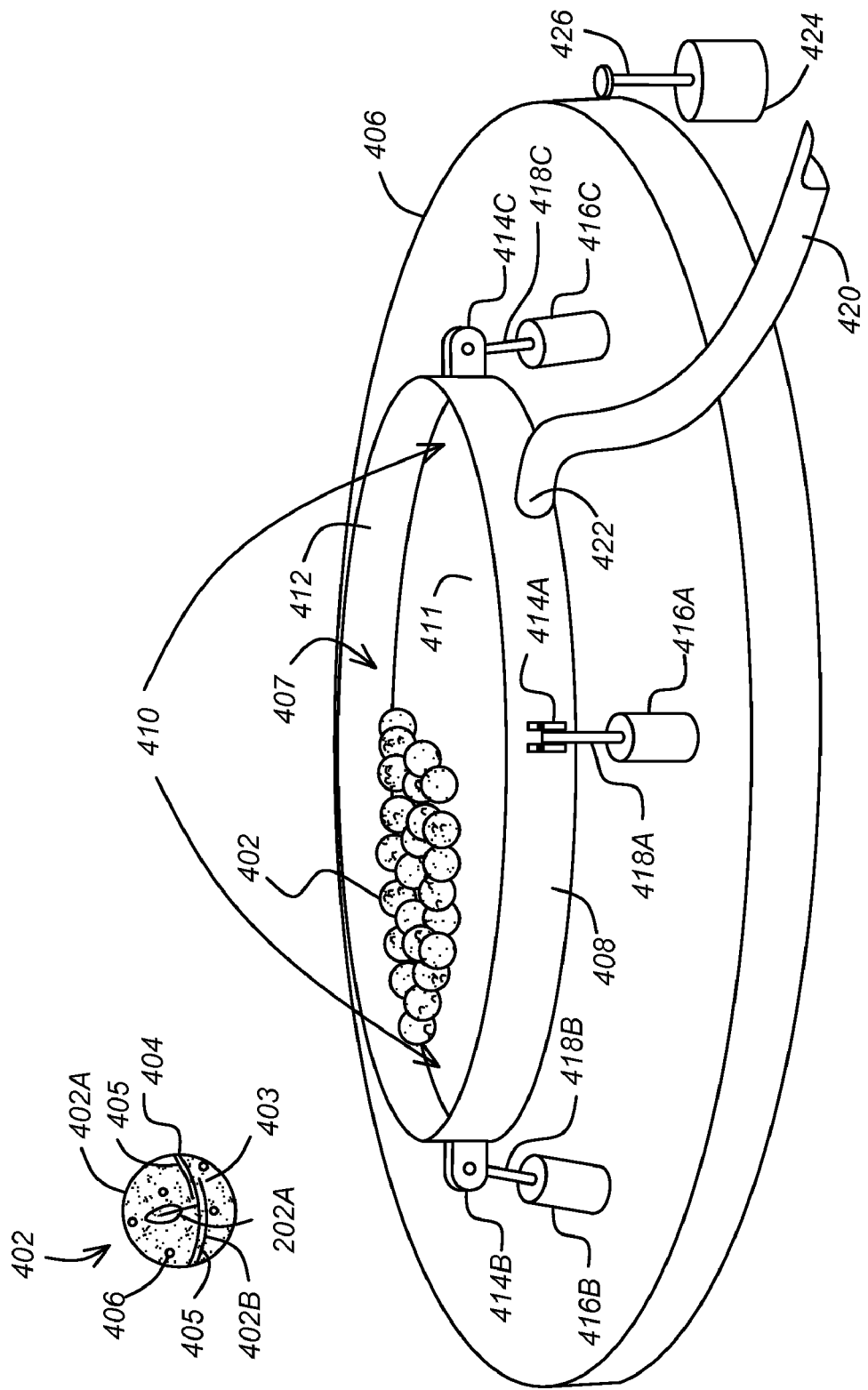
FIG. 4 is a diagram illustrating another apparatus that may be used to perform the method steps illustrated in FIG. 1.

FIG. 4 is another embodiment of an apparatus for subjecting germinating seeds to either a periodically or continually varying gravity vector. The advantage of this embodiment is that it provides randomized motion while conserving energy, because solenoids are used instead of motors to reorient the seeds, and because truly randomized orientation is more readily achievable.

In this embodiment, one or more seeds 202A are placed within one or more hollow spheres 402. In one embodiment, each sphere includes one or more apertures 406 that are sized to permit entry and egress of air and/or water, but which retain substantially all of the soil 403 within the sphere 402. In the illustrated embodiment, the spheres are translucent so as to allow the passage of light within. If desired, the size, shape and number of the apertures 406 can be varied to provide a greenhouse effect within the sphere to promote growth. Alternatively, the apertures can be eliminated altogether.

In one embodiment, each sphere comprises a first hollow hemisphere 402A and a second hollow hemisphere 402B that are sealingly and seperably joinable together. In the illustrated embodiment, this is accomplished via matching threads 405 on the first and second hemispheres 402A, 402B. Thus, the seeds 202A can be placed within the hollow spheres 402 by filling each hemisphere 402A, 402B with soil, placing a seed on the soil, then attaching one hemisphere 402A to the other 402B. In another embodiment, the hemispheres simply snap together. The hemispheres can be made from plastic or any suitable material.

The one or more spheres 402 having the seeds 202A therein are placed within a tray 407. The tray 407 confines the spheres to a basin area 410 within the periphery 412 of the tray, but also permits the spheres 402 to roll about on the rolling surface 411. The rolling surface 411 may be substantially flat, or provided with a surface that helps to randomize the orientation of the spheres 402. In one embodiment, the rolling surface 411 is dimpled. If desired, the dimples may be randomly placed.

In the illustrated embodiment, the tray 407 is suspended above the platform 406 by a plurality of solenoid assemblies, which include a solenoid 416A-416D and a solenoid shaft 418A-418D. In the illustrated embodiment, the solenoids 416 are equally distributed about the periphery of the tray 407, but this need not be the case.

The solenoids 416A-416D are disposed on the platform 406 and are used to tilt the tray 407 to displace the spheres 402 within the tray 407 so that they may be randomly oriented. The solenoids 416 may be activated one, two, or three at a time, and may be activated according to an established schedule, or randomly.

Each solenoid 416A-416D includes a shaft 418A-418D longitudinally extendible in a direction away from the platform 406 upon activation (or deactivation) of the solenoid 416. Each shaft 148 includes an end distal from the solenoid 416 that is coupled to the tray 407 proximate the tray's periphery. In the illustrated embodiment, the distal end of the shaft 416 is rotatably coupled to the tray 407 joints 414A-414D at the periphery of the tray 407.

The apparatus is operated by energizing one or more of the solenoids 416 at a time, thus tilting the tray 407 and causing the spheres 402 to roll across the rolling surface 411. The distance each sphere 407 rolls will be substantially randomized, thus, the orientation of the sphere (and the seed within) will be random.

In one embodiment, one or more of the solenoids is activated and kept in an active state, so that the spheres 407 roll against the edge 412 of the tray 407 and remain there until there is another change in the solenoid activation. This embodiment is preferable, since the spheres 402 will generally be unbalanced and left to their own devices, will tend to rest in a position wherein the center of gravity of the sphere is as low as possible.

In another embodiment, the solenoids are briefly energized to move the spheres 407 to a new position, then de-energized so that the spheres 402 remain in their current state. The rolling surface 411 may be smooth to facilitate rolling, or may be unsmooth (e.g. lined with a material that somewhat, but not completely inhibits rolling).

The embodiment shown in FIG. 4 also includes a port 422 which is disposed in the edge 412 and a hose 420 sealingly coupled to the port 422. This permits the entry and egress of liquids such as water into the basin area 410 so that the seeds may be suitably moist. Plant nutrients may be added to the water, if desired. The water may also be used to randomize the motion of the spheres 402.

FIG. 4 also discloses the use of a motor 424 and idler pulley 426 in contact with the platform 406, to commandably rotate the platform 406 (and hence, the tray 407. This can be used to randomize the motion of the spheres by permitting the tray 407 to be tilted in any direction (e.g. by energizing a solenoid and suitable rotation of the platform 406.

Figure 5:
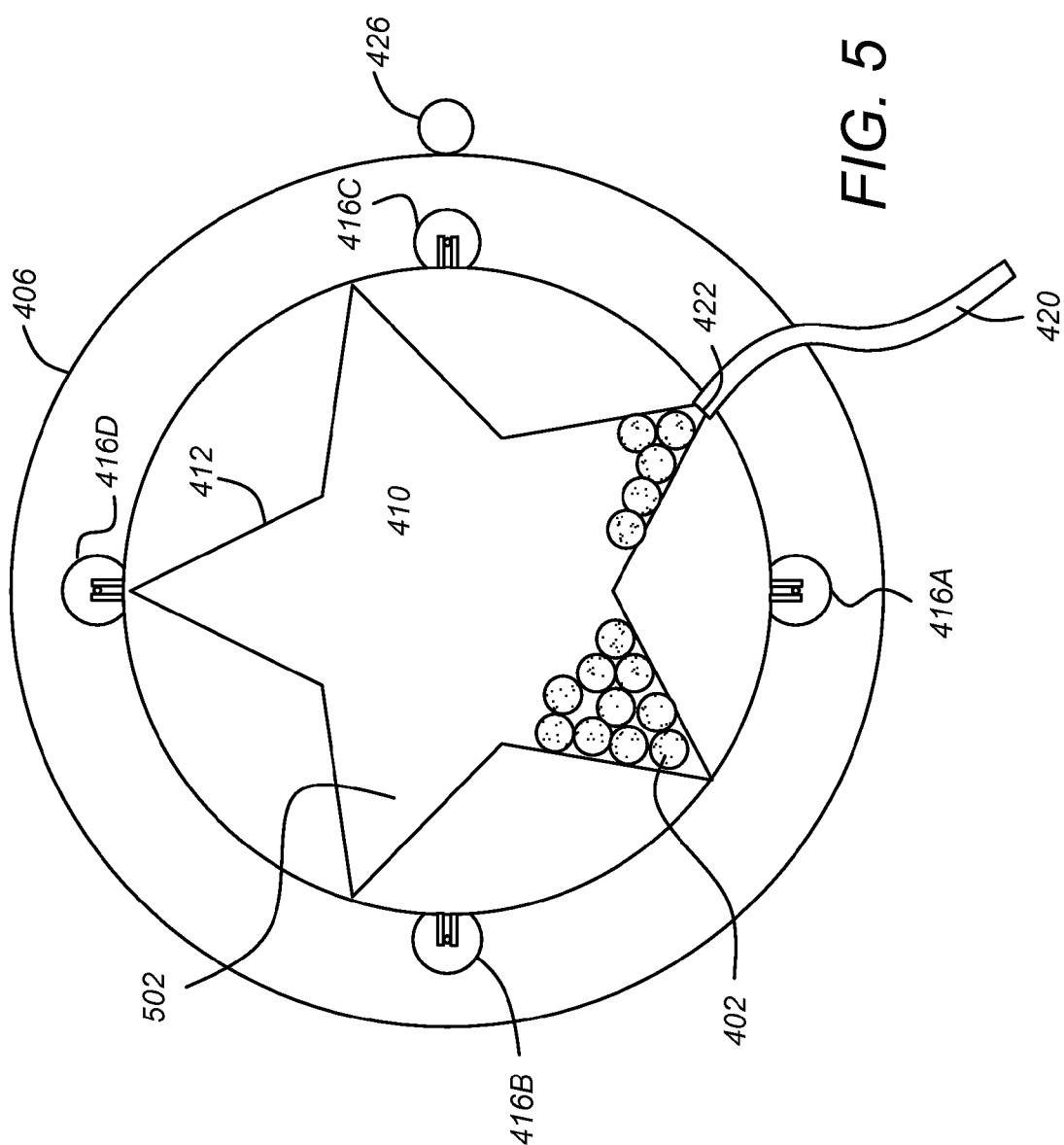
FIG. 5 is a diagram illustrating another apparatus that may be used to perform the method steps illustrated in FIG. 1.

FIG. 5 is a diagram illustrating another embodiment of the apparatus. In this embodiment, the tray periphery 412 has a number (n) of concave features 502. In the illustrated embodiment, n=5, (the tray 407 is star-shaped) and the spheres 402 are collected within one of the concave features 502. Note that in this embodiment, there are n−1 (4) solenoids. Hence, energizing some of the solenoids 416 will tend to distribute the spheres into different concave features 502 (e.g. if all of the spheres were in the concave feature nearest solenoid 416D and that solenoid was energized, the spheres 407 would tend to array themselves in different opposing concave features, as illustrated in FIG. 5. Choosing the number of solenoids to be one less than the number of convex structures helps to randomize the displacement of the spheres within the convex areas 502.

Figure 6:
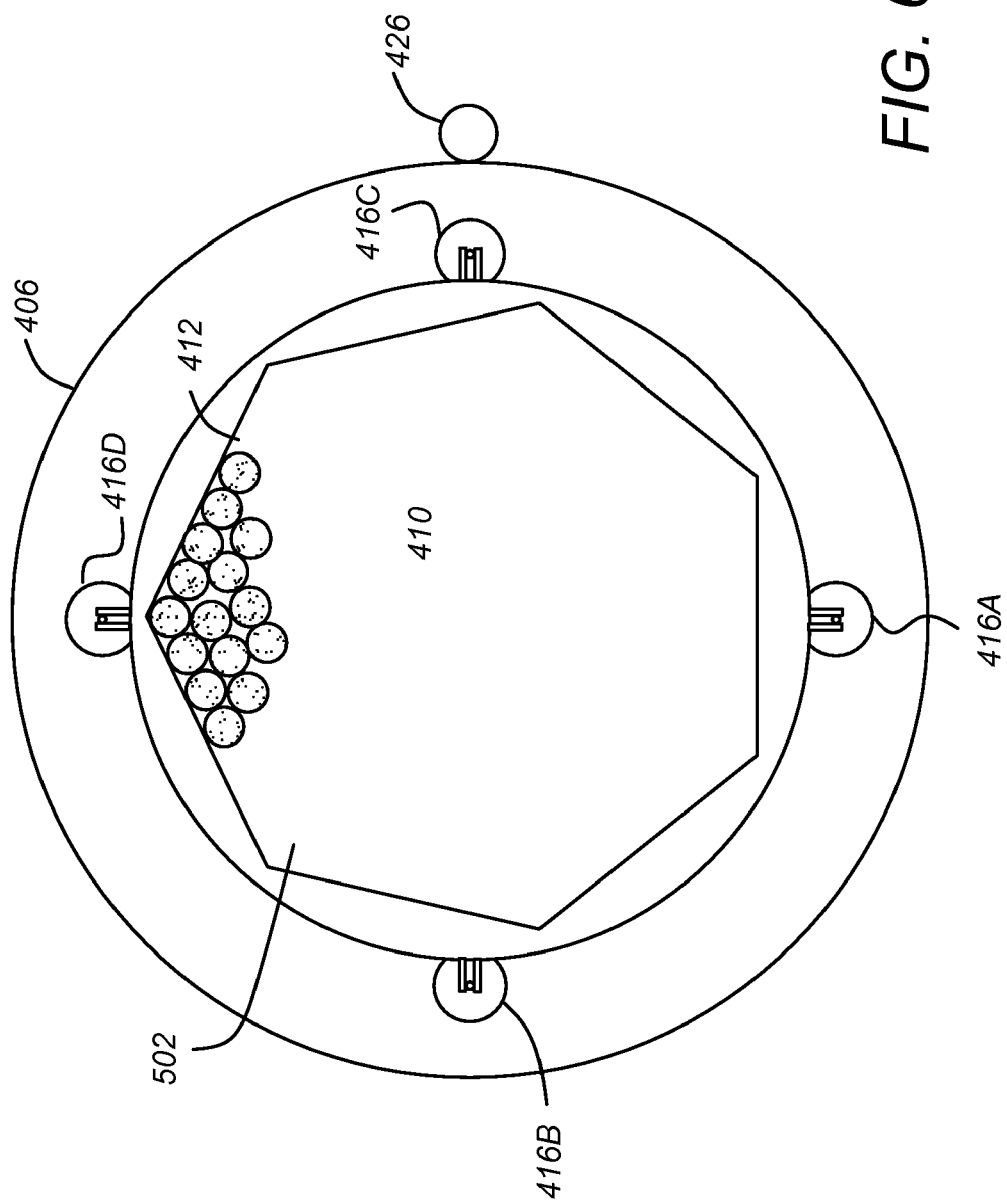
FIG. 6 is a diagram illustrating another apparatus that may be used to perform the method steps illustrated in FIG. 1.

FIG. 6 is a diagram showing another embodiment of an apparatus have a tray with concave areas. Again, as the solenoids are energized, the fact that the solenoids are arrayed asymmetrically when compared t the shape of the tray (assured because the number concave portions 502 is not a multiple of the number of solenoids), the motion and resting place of the spheres will tend to be random.

In another embodiment, the shape of the tray periphery may be randomized (e.g. a polynomial with the length of each of its sides is a random variable). Further, in addition to or in the alternative to the foregoing techniques, the diameter of the spheres 402 can be selected such that there are a plurality of different sizes within the tray 407 at a time, thus further randomizing the orientation of the spheres as the solenoids are energized.

What is claimed is:

1. An apparatus for germinating seeds, comprising:
   a plurality of translucent hollow spheres, each sphere having apertures there through for entry and egress of liquid and air, wherein each of the plurality of translucent hollow spheres includes soil and at least one of the seeds;
   a tray, for confining the spheres to an basin area within a periphery of the tray while permitting the spheres to roll on a rolling surface within the periphery of the tray;
   a platform; and
   a plurality of solenoids disposed on the platform for tilting the tray to displace the spheres, each solenoid having a shaft longitudinally extendable in a direction away from the platform upon activation of the solenoid and each shaft having an end distal from the solenoid coupled proximate to the periphery of the tray.

2. The apparatus of claim 1, wherein the periphery of the tray comprises an edge having a port there through, the port for entry and egress of water into the basin area.

3. The apparatus of claim 2, wherein the shafts are equally distributed about the periphery of the tray.

4. The apparatus of claim 3, wherein the tray periphery has n concave features, wherein n is greater than 2.

5. The apparatus of claim 4, wherein the number of solenoids is n−1.

6. The apparatus of claim 5, wherein the tray periphery is star shaped.

7. The apparatus of claim 6, wherein the spheres each have a different diameter.

8. The apparatus of claim 7, wherein the tray comprises a plurality of joints at a periphery of the tray, each of the plurality of joints rotatably coupling to an end of the shaft distal from the solenoid.

9. The apparatus of claim 8, wherein each sphere comprises a first hollow hemisphere and a second hollow hemisphere, sealingly and separably joinable together via matching threads in the first hollow hemisphere and the second hollow hemisphere.

10. The apparatus of claim 9, wherein the rolling surface is substantially flat.

11. The apparatus of claim 9, wherein the rolling surface is dimpled and the dimples are randomly distributed on the rolling surface.

12. The apparatus of claim 9, wherein the platform is commandably rotatable via a motor and an edge driven pulley.

\* \* \* \* \*